US008543565B2

(12) United States Patent
Feng

(10) Patent No.: US 8,543,565 B2
(45) Date of Patent: Sep. 24, 2013

(54) SYSTEM AND METHOD USING A DISCRIMINATIVE LEARNING APPROACH FOR QUESTION ANSWERING

(75) Inventor: Junlan Feng, Basking Ridge, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 919 days.

(21) Appl. No.: 11/851,817

(22) Filed: Sep. 7, 2007

(65) Prior Publication Data

US 2009/0070311 A1    Mar. 12, 2009

(51) Int. Cl.
  *G06F 17/30*    (2006.01)
(52) U.S. Cl.
  USPC .......................................................... 707/708
(58) Field of Classification Search
  USPC .................... 707/103, 708, 748, 999.004
  See application file for complete search history.

(56) References Cited

U.S. PATENT DOCUMENTS

| | | | |
|---|---|---|---|
| 2002/0111792 A1* | 8/2002 | Cherny | 704/8 |
| 2003/0004706 A1* | 1/2003 | Yale et al. | 704/9 |
| 2004/0030556 A1* | 2/2004 | Bennett | 704/270 |
| 2005/0256700 A1* | 11/2005 | Moldovan et al. | 704/9 |
| 2006/0235689 A1* | 10/2006 | Sugihara et al. | 704/257 |
| 2008/0319735 A1* | 12/2008 | Kambhatla et al. | 704/9 |

OTHER PUBLICATIONS

Jimmy Lin et al., "Extracting Answers from the Web Using Knowledge Annotation and Knowledge Mining Techniques", Proceedings of the Eleventh Text Retrieval Conference (TREC 2002), Nov. 2002.
Junlan Feng et al., "WebTalk: Mining Websites for Interactively Answering Questions", Proceedings of Interspeech2005, Sep. 2005.
Ellen M. Voorhees, "Overview of the TREC 2003 Question Answering Track", Proceedings of TREC 2003.
Adam Berger et al., "Bridging the Lexical Chasm: StatiStical Approaches to Answer-Finding", Research and Development in information Retrieval, pp. 192-199, ACM: 2000.
Radu Soricut et al., "Automatic Question Answering: Beyond the Factoid", Proc. of HLT-NAACL 2004.

* cited by examiner

*Primary Examiner* — Mohammed R Uddin

(57) ABSTRACT

Disclosed are systems, methods, and computer readable media for answers to natural language questions. The method embodiment comprises training a lexical association model between a question and a first set of one or more possible answers, training a semantic association model between a question and a second set of one or more possible answers, receiving a user question containing at least one query word, parsing the user question syntactically and semantically, formulating a query from the parsed user question containing at least one query word, expanding the query based on the lexical association model and the semantic association model, weighting the at least one query word according to its importance when answering the user question, and returning an answer based on the weighted at least one query word, the lexical association model, and the semantic association model. Other features include using question-answer pairs mined to train the models and returning a plurality of answers in an order based on the lexical association model and the semantic association model.

20 Claims, 3 Drawing Sheets

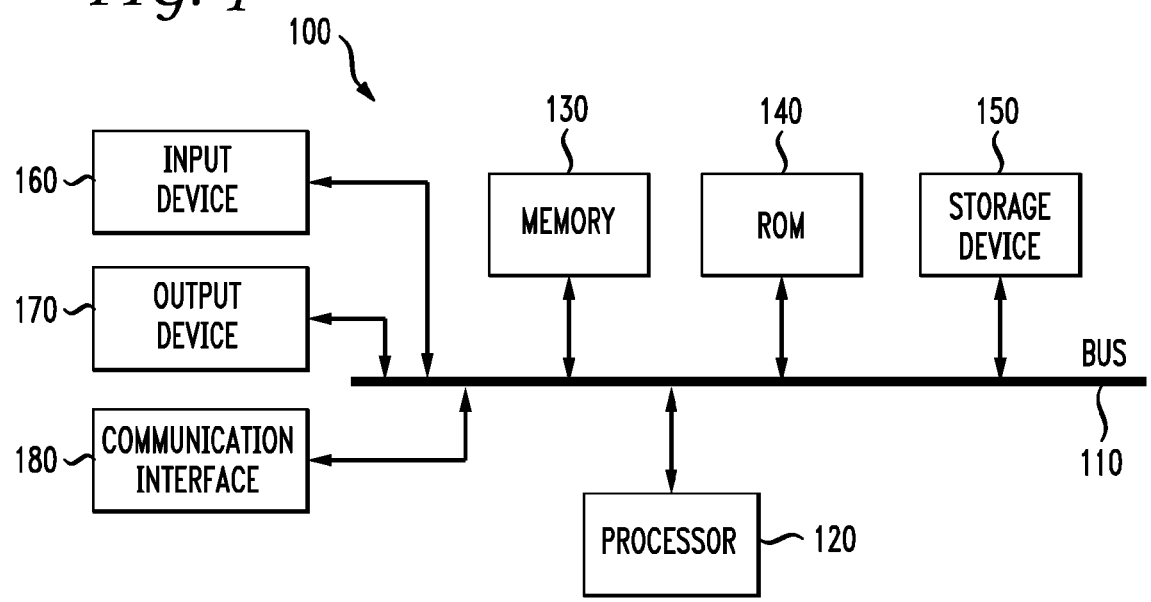
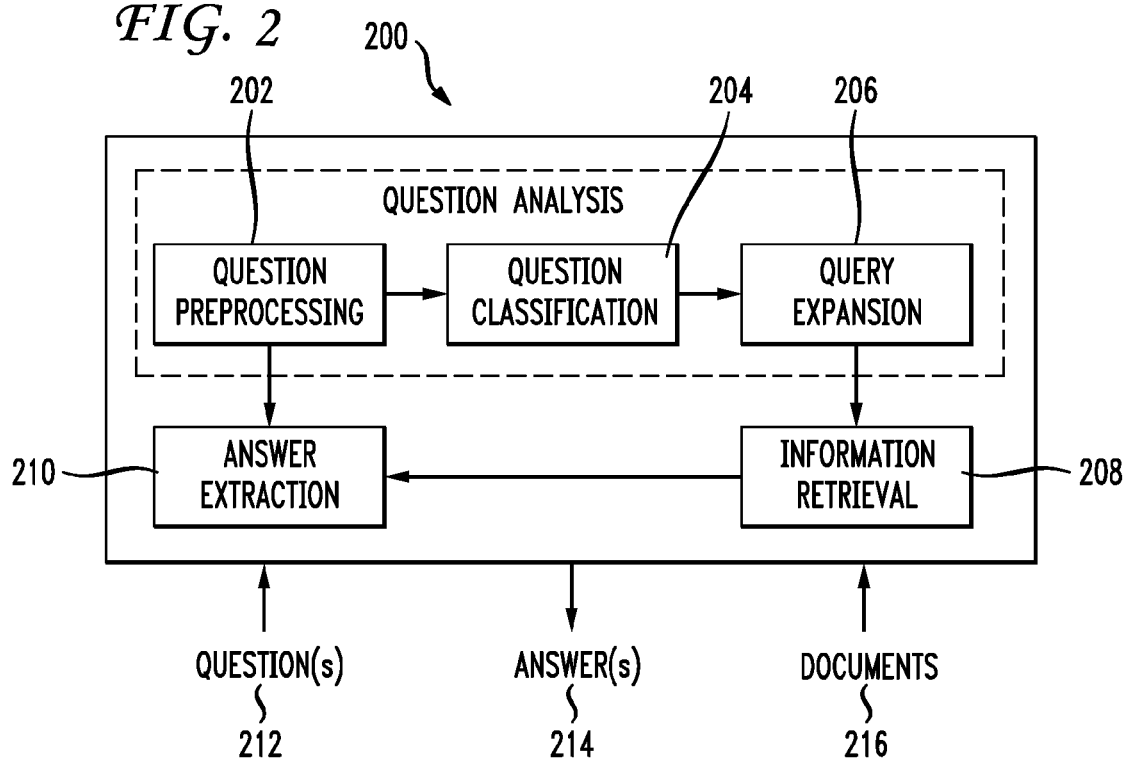

302 — Inputs: A training set of question-answer (QA) pairs $\{(q_i, a_i)\}$ for $i=1\ldots n$., where each QA pair has an associated website $site(i)$ that $(q_i, a_i)$ appears on; a parameter T specifying the number of iterations over the training set; A feature function $\phi(q,a) \in \Re^k$ that maps a question-answer pair to a $k$-dimensional feature vector.

304 — Initialization: Initialize the parameter vector $W$

306 — Training:

For $t=1\ldots T$,

*Set a k-dimensional vector*: $W^{sum} = 0$

For $i=1\ldots n$,

- Create a temporal parameter vector:
  $W' = W$

- Find the best answer using the current $W$:
  $$\tilde{a}_i = \arg\max_{site(j)=site(i)} \phi(q_i, a_j) \cdot W$$

- If $\tilde{a}_i = a_i$, then update the $W'$:
  $$W' = W + \phi(q_i, a_i) - \phi(q_i, \tilde{a}_i)$$

- Accumulate Parameters:
  $W^{sum} = W^{sum} + W'$

*Average Parameters*: $W = W^{sum}/n$

308 — Output: $W$

SYSTEM AND METHOD USING A DISCRIMINATIVE LEARNING APPROACH FOR QUESTION ANSWERING

BACKGROUND OF THE INVENTION

1. Field of the Invention

The present invention relates generally to automated question answering and more specifically to computer-based discriminative learning approaches for answering natural-language questions.

2. Introduction

Question answering (QA) is an interactive human-machine process that aims to find a direct answer to a natural language question from a collection of documents or document fragments, which could be the entire internet, customer care FAQs, a corporate website, or a collection of news articles. Unlike state-of-art spoken dialog systems, which are often configured by a hand-crafted dialog flow and designed for completing tens to hundreds of distinct user requests, QA systems are controlled by information provided in unstructured documents and designed to locate answers to natural language requests pertaining to the content of the given unstructured documents. There has been a body of work on question answering in both the computational linguistic literature and in the industry. A variety of knowledge-intensive approaches have been reported in the Computational Linguistics community (e.g. Text Retrieval Conference (TREC), Message Understanding Conference (MUC), Question Answering workshops in ACL and a number of ACM conferences). A few emerging customer-care question/answering systems, such as the Ikea Anna system or the AT&T Consumer Ask Allie are primarily company-specific and focus on establishing a task ontology with manually crafted questions and answers. Even more established general domain question answering systems, such as AskJeeves and the START natural language question answering system, which have evolved over many years, are very limited in their ability to answer questions.

Accordingly, what is needed in the art is an improved way to provide accurate automated answers to general natural language questions.

SUMMARY OF THE INVENTION

Additional features and advantages of the invention will be set forth in the description which follows, and in part will be obvious from the description, or may be learned by practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth herein.

Disclosed herein are systems, methods, and computer readable media for providing answers to natural language questions. An exemplary method embodiment of the invention comprises training a lexical association model between a question and a first set of one or more possible answers, training a semantic association model between a question and a second set of one or more possible answers, receiving a user question containing at least one query word, parsing the user question syntactically and semantically, formulating a query from the parsed user question containing at least one query word, expanding the query based on the lexical association model and the semantic association model, weighting the at least one query word according to its importance when answering the user question, and returning an answer based on the weighted at least one query word, the lexical association model, and the semantic association model.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIG. 1 illustrates a basic system or computing device embodiment of the invention;

FIG. 2 illustrates a typical diagram of modern QA systems;

FIG. 3 illustrates a variant of the perceptron algorithm for QA; and

DETAILED DESCRIPTION OF THE INVENTION

Figure 4:
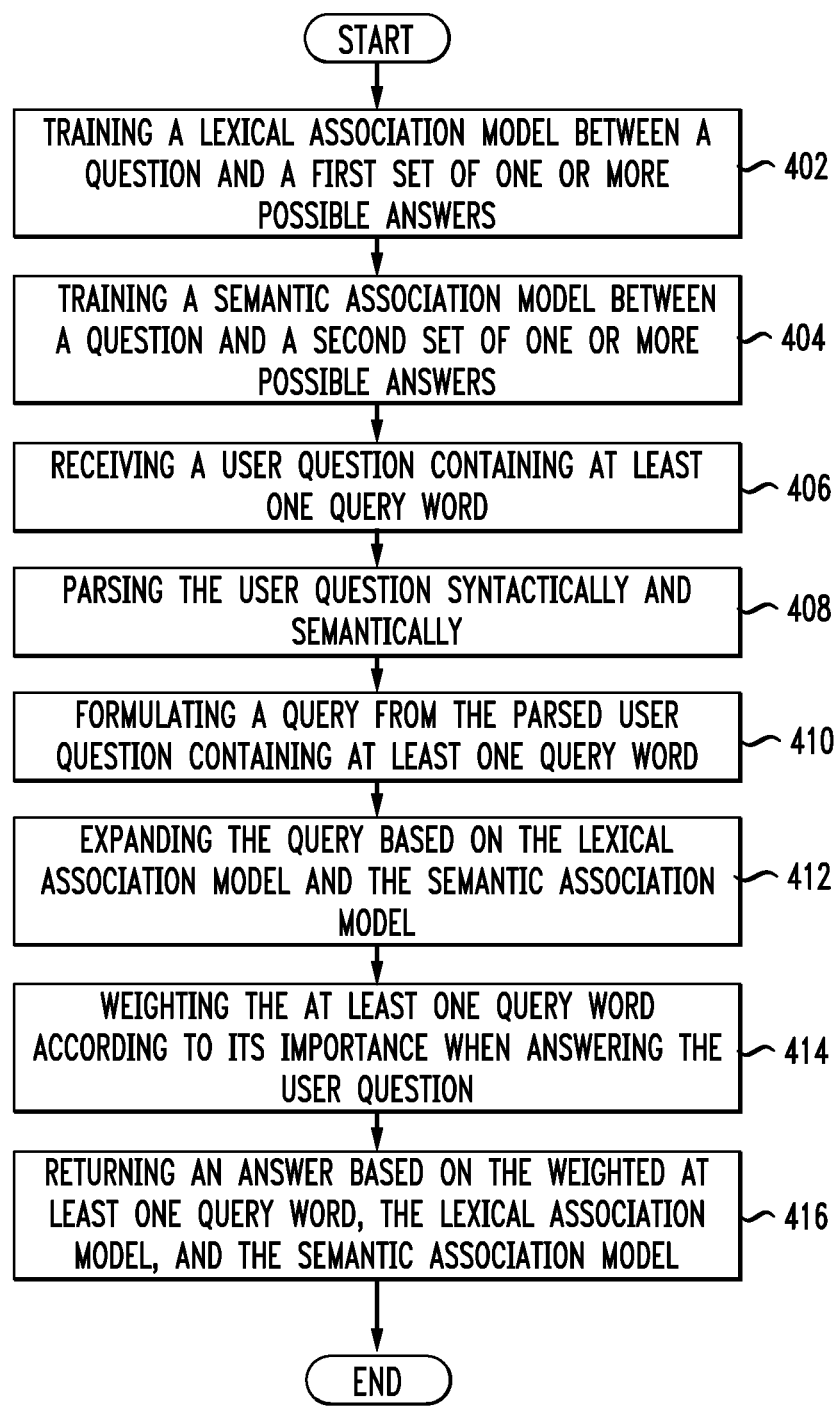
FIG. 4 illustrates a method embodiment of the invention.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

With reference to FIG. 1, an exemplary system for implementing the invention includes a general-purpose computing device 100, including a processing unit (CPU) 120 and a system bus 110 that couples various system components including the system memory such as read only memory (ROM) 140 and random access memory (RAM) 150 to the processing unit 120. Other system memory 130 may be available for use as well. It can be appreciated that the invention may operate on a computing device with more than one CPU 120 or on a group or cluster of computing devices networked together to provide greater processing capability. The system bus 110 may be any of several types of bus structures including a memory bus or memory controller, a peripheral bus, and a local bus using any of a variety of bus architectures. A basic input/output (BIOS), containing the basic routine that helps to transfer information between elements within the computing device 100, such as during start-up, is typically stored in ROM 140. The computing device 100 further includes storage means such as a hard disk drive 160, a magnetic disk drive, an optical disk drive, tape drive or the like. The storage device 160 is connected to the system bus 110 by a drive interface. The drives and the associated computer readable media provide nonvolatile storage of computer readable instructions, data structures, program modules and other data for the computing device 100. The basic components are known to those of skill in the art and appropriate variations are contemplated depending on the type of device, such as whether the device is a small, handheld computing device, a desktop computer, or a computer server.

Although the exemplary environment described herein employs the hard disk, it should be appreciated by those skilled in the art that other types of computer readable media which can store data that are accessible by a computer, such as magnetic cassettes, flash memory cards, digital versatile disks, cartridges, random access memories (RAMs), read only memory (ROM), a cable or wireless signal containing a bit stream and the like, may also be used in the exemplary operating environment.

To enable user interaction with the computing device 100, an input device 190 represents any number of input mechanisms, such as a microphone for speech, a touch sensitive screen for gesture or graphical input, keyboard, mouse, motion input, speech and so forth. The input may be used by the presenter to indicate the beginning of a speech search query. The device output 170 can also be one or more of a number of output means. In some instances, multimodal systems enable a user to provide multiple types of input to communicate with the computing device 100. The communications interface 180 generally governs and manages the user input and system output. There is no restriction on the invention operating on any particular hardware arrangement and therefore the basic features here may easily be substituted for improved hardware or firmware arrangements as they are developed.

For clarity of explanation, the illustrative embodiment of the present invention is presented as comprising individual functional blocks (including functional blocks labeled as a "processor"). The functions these blocks represent may be provided through the use of either shared or dedicated hardware, including, but not limited to, hardware capable of executing software. For example the functions of one or more processors presented in FIG. 1 may be provided by a single shared processor or multiple processors. (Use of the term "processor" should not be construed to refer exclusively to hardware capable of executing software.) Illustrative embodiments may comprise microprocessor and/or digital signal processor (DSP) hardware, read-only memory (RO for storing software performing the operations discussed below, and random access memory (RAM) for storing results. Very large scale integration (VLSI) hardware embodiments, as well as custom VLSI circuitry in combination with a general purpose DSP circuit, may also be provided.

A typical diagram of modern question answering (QA) systems is illustrated in FIG. 2. A QA system takes a question as input 212 and returns answers 214 from given documents 216. Input may be text, speech and text or any combination of multimodal input. Those of skill in the art will recognize different modalities including motion sensing. Thus, the input may be further presumed to generate data in a form that can be processed by the system. Question analysis consists of question preprocessing 202, question classification 204, and query expansion 206. Question preprocessing 202 parses a natural language question with syntactic tags such as part-of-speech tags and named entity (NE) tags. Question classification 204 determines the expected answer type of the question that allows subsequent processes to precisely locate and verify the answer. Query expansion 206 formulates the keyword queries for being used to retrieve documents. Information retrieval (IR) 208 retrieves documents relevant to the generated keyword queries. These retrieved documents are deemed likely to contain valid answers to the question. Answer extraction 210 extracts the precise answer from the retrieved documents. The underlying techniques to support these steps are built upon language processing technologies, IR and statistics. Many knowledge-intensive approaches have been developed for QA. For instance, the LCC system, PowerAnswer, transforms questions and possible answer text into a logic representation and then builds a formal proof for valid answers. For more information, see Dan Moldovan, Sanda Harabagiu, Roxana Girju, Paul Morarescu, Finley Lacatusu, Adrian Novischi, Adriana Badulescu, and Orest Bolohan, "LCC tools for question answering", Proc. Of TREC 2002, November 2002, the entirety of which is incorporated herein by reference.

Data driven approaches are relatively less explored, yet recently have received much more attention. For example, a learning approach to classifying questions into two-layered fine-grained classes is described in X. Li, D. Roth, "Learning Question Classifiers", Proc. Of COLING'02, August 2002, the entirety of which is incorporated herein by reference. Statistical translation models to learn the lexical relationship between questions and answers are described in Adam Berger, Rich Caruana, David Cohn, Dayne Freitag, Vibu Mittal, "Bridging the Lexical Chasm: Statistical Approaches to Answer-Finding", Research and Development in Information Retrieval, pages 192-199 and R. Soricut, E. Brill, "Automatic Question Answering: Beyond the Factoid", Proc. Of HLT-NAACL 2004, the entirety of each of these documents is incorporated herein by reference.

The present disclosure relates to a discriminative learning approach for question answering. In an example embodiment, the training corpus consists of 2 million Frequently Asked Questions (FAQs) and their corresponding answers that were mined from the World Wide Web. This corpus was used to train the lexical and semantic association model between questions and answers. Those of skill in the art will recognize that other training corpora may be used to train with question and corresponding answers mined or acquired from other sources, including other types of documents or databases. Furthermore, the corpus can consist of more or less question and answers than that used in the example embodiment.

Most QA systems rely on IR to return top relevant documents, from which the precise answer is extracted. The present example embodiment assumes candidate responses can be prepackaged. For the training data, all the answers are originally individual units. Under this assumption, a solution for QA is to use the IR model, where the match score between a question and an answer is based on exact keyword match. The candidate response achieving the highest score is returned as the best answer. For IR, each keyword is typically weighted using the tf.idf mechanism. For more information, see G. Salton and M. McGill, "Introduction to Modern Information Retrieval", McGraw-Hill, 1983, the entirety of which is herein incorporated by reference. Given a collection of prepackaged answers $A=\{a_1, a_2, \ldots a_N\}$, the tf.idf weights for each word $w_j$ appearing in $a_i$ can be represented as:

$$tf.idf(a_i, w_j) = tf_{ij} * idf_j = tf_{ij} \cdot \log_2 \frac{N}{df_j} \quad (1)$$

where $tf_{ij}$ is referred to as term frequency—the frequency of the word $w_j$ the answer $a_j$; $df_j$ is referred to as document frequency—the number of answers in which $w_j$ occurs at least once; and N is the total number of answers in the collection. The QA match score based on tf.idf between an m-word question $q=\{v_1, v_2, \ldots v_m\}$ and an n-word answer $a=\{u_1, u_2, \ldots u_n\}$ is represented as:

$$\text{score}(q, a) = \sum_{w \in q, a} tf.idf(a, w) \cdot tf.idf(q, w) \cdot Z(q, a) \quad (2)$$

Where $Z(q,a)$ is a normalization factor:

$$Z(q, a) = \frac{1}{\sqrt{\sum_{t \in q} (tf.idf(q, w))^2} \cdot \sqrt{\sum_{t \in a} (tf.idf(a, w))^2}} \quad (3)$$

This tf.idf based match model has been successfully used in the search engines. However, it performs poorly in QA systems. This poor performance results from certain QA challenges. For example, tf.idf weights are solely determined by the answer collection. However, some words, in general, are more important for answer retrieval. For instance, the word "china" is more likely to be a QA common word than the word "take" independent of their occurrences in the specific answer set. Another challenge is a semantic gap between questions and answers. A question expresses an information need that the valid answer is expected to satisfy. For example, a "when" question often expects an answer containing a TIME/DATE named entity value. A "why" question expects a reason for the matters concerned. The IR model based on exact word match doesn't provide a solution to bridge this QA semantic chasm. Another challenge is questions and answers are often phrased in different vocabularies and styles. The inventor observed that 12% of the QA pairs in their training corpus didn't have a single common keyword. This mismatch results in many cases that the correct answer is not retrieved or ranked as the first. Researchers have addressed this challenge with various methods such as query expansion and statistical translation models. For more information on query expansion, see S. Harabagiu, D. Moldovan, C. Clark, M. Bowden, J. Williams, J. Bensley, "Answer Mining by Combining Extraction Techniques with Abductive Reasoning", Proc. Of TREC 2003, the entirety of which is incorporated herein by reference.

Query expansion expands the keywords appearing in the question to a bigger set of words that are likely to appear in the answer. For instance, "reach" can be expanded to "fax" and "phone". The difficulty is that the expanded word such as "fax" may bring in noise and twist the user's information needs for some cases. Berger and Soricut proposed more statistical algorithms including latent variable models and statistical translation models to bridge the lexical gap between questions and answers. From the experiments reported in Berger, the highly parameterized techniques based on statistical translation models showed the best performance. The learned translation models were applied to re-rank tens of candidate answers/documents returned by IR. However, it's hard to scale up this algorithm to directly select answers from a large collection of documents. The present embodiment addresses these challenges. Its training objective is to optimize the importance weights of the query words, and to learn the lexical and semantic relationship between questions and answers.

The present embodiment begins with IR as its baseline, where the match score between a question q and an answer a is calculated with the formula (2). The best answer for a given $q_i$ is selected as:

$$a_i = \underset{a_j \in A}{\operatorname{argmax}} \operatorname{score}(q_i, a_j) \quad (4)$$

where $A=\{a_1, a_2, \ldots a_N\}$ is a collection prepackaged answers as defined above.

The formula (2) can be rewritten with a general linear representation:

$$\operatorname{score}(q,a) = \phi(q,a) \cdot W \quad (5)$$

Where $\phi$ is a function that maps a question q and an answer a to a k dimensional feature vector $\phi(q,a) \in \Re^k$; $W \in \Re^k$ is a k dimensional parameter vector.

For the tf.idf based match score given by formula (2), k is the number of keywords recognized in the answer collection; the feature vector is constituted by the tf.idf weights:

$$\phi(q,a) = (docf(w_1,q,a), docf(w_2,q,a), \ldots, docf(w_K,q,a))$$

Where docf is the normalized tf.idf weight defined as follows:

$$docf(w, q, a) = \begin{cases} tf.idf(a, w) \cdot tf.idf(q, w) \cdot Z(q, a), & w \in q, a \\ 0 & \text{otherwise} \end{cases} \quad (6)$$

W in this case is a k dimension vector with all components equal to one.

Given this linear representation, an example embodiment uses the voted perceptron algorithm, described by M. Collins, "Discriminative training methods for hidden markov models: Theory and experiments with perceptron algorithms", Proc. Of EMNLP, 2002 the entirety of which is incorporated herein by reference. An example embodiment uses the perceptron algorithm to estimate the parameter vector W for any given feature function $\phi$. The learning objective is to achieve higher answer accuracy, which is defined as:

$$\text{accuracy} = \frac{\text{number of times the correct awnser is ranked first}}{\text{total number of questions in the test set}}$$

The preferred embodiment uses a variant of the perceptron training algorithm 300. The inventor will elaborate on a series of methods for the feature function $\phi(q,a)$ described below. The voted perceptron algorithm described in Collins has been applied to various natural language processing problems such as tagging or parsing. It has been shown on these tasks to be competitive compared to modern learning algorithms including conditional random fields and support vector machines. The present example embodiment applies this method to QA. A variant of the voted perceptron training algorithm in FIG. 3 for the QA problem. The algorithm takes T passes over the training examples 302. Parameters in W are initialized 304 differently for different types of features, which is described below. For each question $q_i$ in the training corpus, a temporal parameter vector W' is created as a copy of W and the best answer $a_i$, from the same website that the question appears on, is returned using the current W 306. If the returned best answer is not correct, the temporal parameters W' are updated in a simple additive fashion. Parameters W are updated using the average parameters at the end of each training pass. The parameter vector W is the output of the learning process after the T'th iteration 308. Note that in the training process of the present embodiment, for each training question, the answer is limited to the search space to the website where the question originated because in the training corpus indicated that for a number of cases, the semantically same question appears on multiple websites and has been answered differently. Consequently, it is difficult to automatically judge the correctness of a returned answer if it is from a website different than the one the question originated. Within a given website, it is more reasonable to assume that the associated answer for a question is the unique correct answer. However, this limitation is unnecessary to the scope of this invention in its broadest form. Furthermore, the question may originate from other sources besides a website as mentioned above. The example is presented for illustrative purposes only.

The present embodiment uses several increasingly sophisticated features towards bridging the lexical and semantic gap between question language and answer language. The first feature (Feature-I) is an exact word match feature. It begins with using normalized tf.idf weights docf (defined in equation (6)) as features. The QA match score (5) becomes:

$$\text{score } (q, a) = \phi(q, a) \cdot W = \sum_{w \in q, a} docf(w, q, a) \cdot qf(w) \quad (7)$$

The parameter qf(w) characterizes the importance of the query keyword w. In the inventor's experiments, qf(w) is initialized to 1 and is estimated using the perceptron algorithm.

The second feature (Feature-II) is a semantic correlation. Most questions start with a question phrase such as "how much does" or "what country". As Agichitain defined in G. Salton and M. McGill, "Introduction to Modern Information Retrieval", McGraw-Hill, 1983, a question phrase, denoted as qp, is a stream of text at the beginning of the question. A question phrase is used to address the specific information need and is often not repeated in the corresponding answers. Modern QA systems often include a question classification component (as shown in FIG. 2), that classifies a question into an NE type, for example, classifying a "when" question to the TIME/DATE category. An instance of this NE category is expected to be included in the answer. This would allow subsequent processes to precisely locate and verify the answer. Instead of training such a question classifier from human labeled data, the preferred embodiment uses an approach to statistically associate a question phrase with multiple NE tags, which are tagged in the answers. A question phrase is limited to a text string no more than four words. In the inventor's experiments, the example embodiment considers a question phrase only when its frequency in the training questions is greater than a preset threshold 30. Each question phrase qp, is associated with an NE ne by calculating mutual information:

$I(qp,ne) = H(p(ne \in a)) - p(qp \in q)H(p(ne \in a | qp \in q)) - p(qp \notin q)H(p(ne \in a | qp \notin q))$ where H(.) is the entropy function:

$H(p) = -p \log_2(p) - (1-p) \log_2(1-p)$

Based on the value of the mutual information I(qp,ne) calculated from the training data, a ne set is built for each qp, represented as NE(qp). For instance, "MONEY" and "NUMBER" are the NEs selected for the qp "what scholarship". Each training question q is then reformulated using the following procedure: (1) Find the longest qp that q begins with (2) Locate the nouns in qp and (3) Replace qp with its associated NE(qp) tags and the nouns appearing in qp. With this reformulation, the QA match score (7) is extended to be the following:

$$\text{score } (q, a) = \phi(q, a) \cdot W = \sum_{w \in q, a} docf(w, q, a) \cdot qf(w) + \quad (8)$$
$$\sum_{ne \in NE(qp), qp \in q} docf(ne, q, a) \cdot \lambda_{sem}(qp, ne)$$

Where $\lambda_{sum}$(qp,ne) is the association parameter between a question phrase qp and an NE tag ne. $\lambda_{sum}$(qp,ne) is preferably initialized to 0 and is estimated with the perceptron training algorithm.

Next is the lexical association feature (Feature-III). The inventor noted the QA lexical relationship by the following observations. First, over 60% of the questions in the training data are open-ended (such as how, why, yes/no types of questions). The information these questions ask for is more complicated than simple NE values. As a result, the QA semantic gap can hardly be bridged through associating question phrases and NE tags for open-ended questions. Second, questions and answers are often phrased using different vocabularies and different styles. Third, answers for open-ended questions are usually much longer than the question. Hence, there is a higher chance that words in the answer are not included in the question. Similar to the above method used to find the associated NE tags for question phrases, associated answer words {g} are found for each query word w by calculating mutual information:

$I(w,v) = H(p(v \in a)) - p(w \in q)H(p(v \in a | w \in q)) - p(w \notin q)H(p(v \in a | w \notin q))$ Based on the value of I(w,v), an answer word expansion set is built for each w, represented by Exp(w). For instance, for the word "travel" an example embodiment achieved the expansion set: Exp(travel)={trip, airline, flight, ticket, traveler]. With these expansion sets, the QA match score (8) is extended to:

$$\text{score } (q, a) = \phi(q, a) \cdot W = \sum_{w \in q, a} docf(w, q, a) \cdot qf(w) + \quad (9)$$
$$\sum_{ne \in NE(qp), qp \in q} docf(ne, q, a) \cdot \lambda_{sem}(qp, ne) +$$
$$\sum_{v \in Exp(w), w \in q, v \in a} docf(v, q, a) \cdot \lambda_{lex}(w, v)$$

Where $\lambda_{lex}$(w,v) is the lexical association parameter. An example embodiment initializes $\lambda_{lex}$(w,v) to 0 during training. Experimental results with the above three types of features will be reported in the next section. The learned parameters including qf(w), $\lambda_{sum}$(qp, ne), and $\lambda_{lex}$(w,v) can be pre-stored and easily used by IR for directly selecting answers from large sets of documents.

The training QA corpus of the present embodiment consisted of 2 million FAQ-Answer pairs mined from 80,000 publicly available .com and .org websites. The inventor evaluated the approach on two different QA tasks: TREC 2003 QA Track—the Passage task, and a FAQ answer finding task. The TREC QA Passage task tests a system's ability to find an answer to a factoid question with a relatively short (250 characters) span of text. For more information the TREC QA Passage task, see E. M. Voorhees, "Overview of the TREC 2003 Question Answering Track", Proceedings of TREC 2003, the entirety of which is incorporated herein by reference. A factoid question is a question asking for simple facts or relations such as "How high is the pitcher's mound?" The document collection used as the source of answers consists of approximately 1,033,000 newswire documents and 3 gigabytes of text. The test question set contains 413 questions drawn from AOL and MSN Search logs. Thirty of these questions have no known correct answer in the document collection. The experiments excluded these thirty questions from the test. When constructing the QA system for this task, each source document was split into short paragraphs (less than 250 characters), stemmed, and labeled with NE tags and Part-of-Speech tags. For more information, see J. Feng, S. Reddy, M. Sarclar, "WebTalk: Mining Websites for Interactively Answering Questions", Proceedings of Interspeech 2005, September, 2005, the entirety of which is incorporated herein by reference. QA performances with this data are given in Table 1. The IR-based baseline achieved 19.0% answer accuracy. The example embodiment used Lucene as the IR engine. For more information on Lucene, see Otis Gospodnetic and Erik Hatcher, "Lucene in Action", 2004, the entirety of which is incorporated herein by reference. Answer accuracy increased to 20.1% using the QA match score given in (7), where only the Feature-I was considered and parameters qf(w) were learned from the training data using the perceptron algorithm. This performance improved further to 28.6% when using parameters learned for Feature-I and Feature-II. The QA match score with Feature-I and Feature-II was defined in formula (8). When exploiting all three types of features as given in formula (9), the answer accuracy increased to 35.7% using the parameters learned from the perceptron training. The overall absolute accuracy improvement is 16.7%.

TABLE 1

Experimental results: answer accuracy

| | Approaches | Answer Accuracy | |
|---|---|---|---|
| | | TREC QA | Answer-Finding |
| | IR | 19.0% | 43.0% |
| Perceptron Training | Feature-I | 20.1% | 47.5% |
| | Feature-I, II | 28.6% | 49.1% |
| | Feature-I, II, III | 35.7% | 55.5% |
| | Absolute Improvement | 16.7% | 12.5% |

In the FAQ answer-finding task, the inventor collected 122,363 FAQ-answer pairs as the test data, which were also mined from the Web but not included in the training data. The inventor used the 122,363 questions as the test questions and used the collection of 122,363 answers as the source from where answers would be chosen. Similar to the way the TREC documents were processed, these answers were preprocessed with stemming, NE tagging, and Part-of-Speech Tagging. Since these answers were prepackaged, this task is referred to as answer-finding. The answer-finding accuracies with this data are given in the last column of Table-1. The overall accuracy improvement with all three types of features is 12.5%. Different from the TREC QA task, over 60% of the questions in this data set are non-factoid questions such as "why" and "how to compare". This partially explains why Feature-I resulted more significant contribution for this data set, while Feature-II didn't improve the performance as much as it did on the TREC QA task.

This disclosure describes a discriminative learning approach for question answering based on a proposed variant of the voted perceptron training algorithm. Learning included (a) weighting query words in terms of their importance to retrieve the correct answer; (b) modeling the lexical association between questions and answers; and (c) modeling the semantic association between questions and answers. In an example embodiment, a training corpus was built consisting of 2 million FAQ and answer pairs by mining the World Wide Web. The approach using two data sets: TREC 2003 QA data and a set FAQ-Answer pairs. The inventor observed that a 16.7% absolute improvement in answer accuracy over an IR-based baseline of 19% answer accuracy for the TREC data and a 12.5% absolute improvement in answer accuracy over an IR-based baseline of 43% for the FAQ answer finding task.

FIG. 4 illustrates an exemplary method embodiment of the invention. The method comprises training a lexical association model between a question and a first set of one or more possible answers 402 and training a semantic association model between a question and a second set of one or more possible answers 404. The first and second set of one or more possible answers used to train the respective models may be the same set or different sets. Furthermore, multiple questions with their respective set of one or more possible answers may be used to train the models. The method further comprises receiving a user question containing at least one query word 406. Query word and query phrase should be used interchangeably here. Some examples of a query words are natural language words, numbers, acronyms, or any other stream of tokens in the question. Queries may comprise any combination of multimodal input such as speech, gestures, motion, text, binary input, and so forth. The method also comprises parsing the user question syntactically and semantically 408, formulating a query from the parsed user question containing at least one query word 410, expanding the query based on the lexical association model and the semantic association model 412, and weighting the at least one query word according to its importance when answering the user question 414. Various aspects of these steps have been discussed herein, and algorithms in the example embodiment should not be viewed as a limitation. For instance, different algorithms or variations can be used in order to weight query words according to their importance. The method further comprises returning an answer based on the weighted at least one query word, the lexical association model, and the semantic association model 416. A plurality of answers may also be returned, sorted in an order based the lexical association model and the semantic association model. While the preferred embodiment sorts the answers according to both models, it is possible to return the answers in an order based on only one of the models.

Embodiments within the scope of the present invention may also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures. When information is transferred or provided over a network or another communications connection (either hardwired, wireless, or combination thereof to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, objects, components, and data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those of skill in the art will appreciate that other embodiments of the invention may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof through a communications network. In a distributed computing environment, program modules may be located in both local and remote memory storage devices.

Although the above description may contain specific details, they should not be construed as limiting the claims in any way. Other configurations of the described embodiments of the invention are part of the scope of this invention. For example, different variants of the perceptron algorithm or different algorithms can be used to train the lexical and association models. Furthermore, the invention could be used in a system with automatic speech recognition functionality such as a call center wherein answers are provided to callers questions. Accordingly, the appended claims and their legal equivalents should only define the invention, rather than any specific examples given.

I claim:

1. A method comprising:
training a lexical association model between a question and a first set of possible answers;
training a semantic association model between the question and a second set of possible answers;
receiving a user question containing query words;
parsing the user question syntactically and semantically, to yield a parsed user question;
expanding the query words based on the lexical association model and the semantic association model, to yield expanded query words;
weighting the expanded query words according to importance when answering the user question, to yield a weighted expanded query words; and returning an answer based on a score calculated based on the following equation:

$$\text{score}(q, a) = \sum_{w \in q, a} docf(w, q, a) * qf(w) + \sum_{ne \in NE(qp), qp \in q} docf(ne, q, a) * \lambda_{sem}(qp, ne) + \sum_{v \in Exp(w), w \in q, v \in a} docf(v, q, a) * \lambda_{lex}(w, v)$$

wherein docf represents a normalized frequency distribution function, w represents individual query words, q represents individual questions, a represents individual answers, NE represents a set of named entity tags, ne represents individual named entity tags, qp represents a question phrase, v represents an answer word, w represents a query word, $\lambda$sem represents a semantic association parameter, $\lambda$lex represents a lexical association parameter, and qf represents the weighted expanded query words.

2. The method of claim 1, wherein question-answer pairs are used to train the lexical and semantic association models.

3. The method of claim 2, wherein the question-answer pairs are mined from the Internet.

4. The method of claim 1, wherein a plurality of questions are used to train the semantic and lexical association models.

5. The method of claim 1, wherein a plurality of answers are returned.

6. The method of claim 5, wherein the plurality of answers is returned in an order based on the lexical association model and the semantic association model.

7. The method of claim 1, wherein training the lexical association model further comprises finding associated answer words for the query word and building an expansion answer set for the query word, wherein the expansion answer set comprises an answer word.

8. The method of claim 7, wherein expanding the query words further comprises finding a question phrase that the question begins with, locating nouns in the question phrase, and replacing the question phrase with associated named entity tags and the nouns appearing in the question phrase.

9. The method of claim 1, wherein the first set and the second set of possible answers comprise different sets.

10. The method of claim 1, wherein the first set and the second set of possible answers comprise the same set.

11. A system comprising:
a processor; and
a computer-readable storage medium having instructions stored which, when executed by the processor, cause the processor to perform operations comprising:
training a lexical association model between a question and a first set of possible answers;
training a semantic association model between the question and a second set of possible answers;
receiving a user question containing query words;
parsing the user question syntactically and semantically, to yield a parsed user question;
expanding the query words based on the lexical association model and the semantic association model, to yield expanded query words;
weighting the expanded query words according to importance when answering the user question, to yield a weighted expanded query words; and returning an answer based on a score calculated based on the following equation:

$$\text{score}(q, a) = \sum_{w \in q, a} docf(w, q, a) * qf(w) + \sum_{ne \in NE(qp), qp \in q} docf(ne, q, a) * \lambda_{sem}(qp, ne) + \sum_{v \in Exp(w), w \in q, v \in a} docf(v, q, a) * \lambda_{lex}(w, v)$$

wherein docf represents a normalized frequency distribution function, w represents individual query words, q represents individual questions, a represents individual answers, NE represents a set of named entity tags, ne represents individual named entity tags, qp represents a question phrase, v represents an answer word, w represents a query word, λsem represents a semantic association parameter, λlex represents a lexical association parameter, and qf represents the weighted expanded query words.

12. The system of claim 11, wherein question-answer pairs are used to train the lexical and semantic association models.

13. The system of claim 11, wherein a plurality of questions are used to train the semantic and lexical association models.

14. The system of claim 11, wherein a plurality of answers are returned.

15. The system of claim 14, wherein a plurality of answers is returned in an order based on the lexical association model and the semantic association model.

16. The system of claim 11, wherein training the lexical association model further comprises finding associated answer words for the query word and building an expansion set for the query word, wherein the expansion set comprises an answer word.

17. The system of claim 16, wherein expanding the query words further comprises finding a question phrase that the question begins with, locating nouns in the question phrase, and replacing the question phrase with associated named entity tags and the nouns appearing in the question phrase.

18. The system of claim 11, wherein the first set and the second set of possible answers are different sets.

19. The system of claim 11, wherein the first set and the second set of possible answers are the same set.

20. A computer-readable storage memory having instructions stored which, when executed by a computing device, cause the computing device to perform operations comprising:
training a lexical association model between a question and a first set of possible answers;
training a semantic association model between the question and a second set of possible answers;
receiving a user question containing query words;
parsing the user question syntactically and semantically, to yield a parsed user question;
expanding the query words based on the lexical association model and the semantic association model, to yield expanded query words;
weighting the expanded query words according to importance when answering the user question, to yield a weighted expanded query words; and returning an answer based on a score calculated based on the following equation:

$$\text{score}(q, a) = \sum_{w \in q, a} docf(w, q, a) * qf(w) + \sum_{ne \in NE(qp), qp \in q} docf(ne, q, a) * \lambda_{sem}(qp, ne) + \sum_{v \in Exp(w), w \in q, v \in a} docf(v, q, a) * \lambda_{lex}(w, v)$$

wherein docf represents a normalized frequency distribution function, w represents individual query words, q represents individual questions, a represents individual answers, NE represents a set of named entity tags, ne represents individual named entity tags, qp represents a question phrase, v represents an answer word, w represents a query word, λsem represents a semantic association parameter, λlex represents a lexical association parameter, and qf represents the weighted expanded query words.

* * * * *